United States Patent
Todd et al.

(10) Patent No.: US 12,028,343 B2
(45) Date of Patent: Jul. 2, 2024

(54) DECENTRALIZED IDENTITIES FOR ACCESS TO MULTIPLE COMPUTING RESOURCE SYSTEMS

(71) Applicant: EMC IP Holding Company LLC, Hopkinton, MA (US)

(72) Inventors: Stephen Todd, North Andover, MA (US); Mark A. O'Connell, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 577 days.

(21) Appl. No.: 17/244,414

(22) Filed: Apr. 29, 2021

(65) Prior Publication Data

US 2021/0250353 A1    Aug. 12, 2021

Related U.S. Application Data

(62) Division of application No. 15/660,385, filed on Jul. 26, 2017, now Pat. No. 11,025,626.

(51) Int. Cl.
*H04L 9/40* (2022.01)
*G06Q 20/40* (2012.01)
*H04L 9/32* (2006.01)

(52) U.S. Cl.
CPC ........... *H04L 63/10* (2013.01); *G06Q 20/401* (2013.01); *H04L 63/08* (2013.01); *H04L 9/3247* (2013.01)

(58) Field of Classification Search
None
See application file for complete search history.

(56) References Cited

U.S. PATENT DOCUMENTS

| 9,635,000 | B1 | 4/2017 | Muftic |
|---|---|---|---|
| 2017/0041296 | A1* | 2/2017 | Ford .................. G06F 21/64 |
| 2017/0177855 | A1 | 6/2017 | Costa Faidella et al. |
| 2017/0243213 | A1 | 8/2017 | Castinado et al. |
| 2018/0300741 | A1* | 10/2018 | Leonard .............. G06Q 30/08 |
| 2020/0143367 | A1* | 5/2020 | LeBeau ............... G06F 21/64 |

OTHER PUBLICATIONS

M. Ali et al., "Blockstack: A Global Naming and Storage System Secured by Blockchains," Proceedings of the USENIX Annual Technical Conference (USENIX ATC), Jun. 22-24, 2016, pp. 181-194.
M. Ali et al., "Blockstack: A New Decentralized Internet," https://blockstack.org, Whitepaper Version 1.0.1, May 16, 2017, 22 pages.
Wikipedia, "Blockstack," https://en.wikipedia.org/wiki/Blockstack, May 28, 2017, 2 pages.
Satoshi Nakamoto, "Bitcoin: A Peer-to-Peer Electronic Cash System," Whitpaper, https://bitcoin.org/bitcoin.pdf, Nov. 2008, 9 pages.

* cited by examiner

*Primary Examiner* — Jamie R Kucab
(74) *Attorney, Agent, or Firm* — Ryan, Mason & Lewis, LLP

(57) ABSTRACT

At least one identity for a given entity is established in accordance with a decentralized identity management system maintained in accordance with a distributed ledger, wherein the identity of the given entity and a set of attributes relating to the identity are defined by a secure token file. The secure token file is referenced in the distributed ledger enabling two or more computing resource systems (e.g., storage systems) to at least one of authenticate and authorize the given entity in accordance with the secure token file.

20 Claims, 9 Drawing Sheets

```
$ BLOCKSTACK UPDATE
STORAGE-USER <zonefile>
```

Bitcoin transaction
......

OP_RETURN "id"
"update"
"storage-user"
hash(ZoneFile)

......
......

302

ZONEFILE: DNS RECORDS

$ORIGIN storage-user
$TTL 3600
"pubkey:data:04cabb..."

_file IN URI 10 1
"file:///Users/.../storage-user"

_https._tcp IN URI 10 1
https://blockstack.url.com/storage-user.id"

_dht_udp IN URI 10 1
"dht+udp://fc449c1481a6349e99f0e3dd7261d67b23dadc5"

304

STORAGE-USER'S PROFILE

| JSON Web Token 1 | ← 310 |
| JWT 2 | ← 312 |
| JWT3 | ← 314 |

[{
"encrypted": false,
"parentPublicKey":
"04cabba0b5b9a871dbaa11c044066e281c5feb57243c7d2a452f06a0d708613a46ced59f806e601b3353931d1e4a98d704012713101631f050bed
c0d4f1162ff",
"token":
—eyJhbGciOiJFUzI1NkslLCJ0eXAiOjKV1QHQ
—eyJpc1L35qYXR0ZXli—*lots of removed characters*
—VkYzBkNGYxZjYyZmYfiX0.
—9jfNYJxWmekoBCzyFpmv9ZNbJaECYKnRBpZnSPSvtKE5NGLbZkb3nF6yG—FclhMivDc4XLhouEC1Hi3Z0woUA"
}]

306

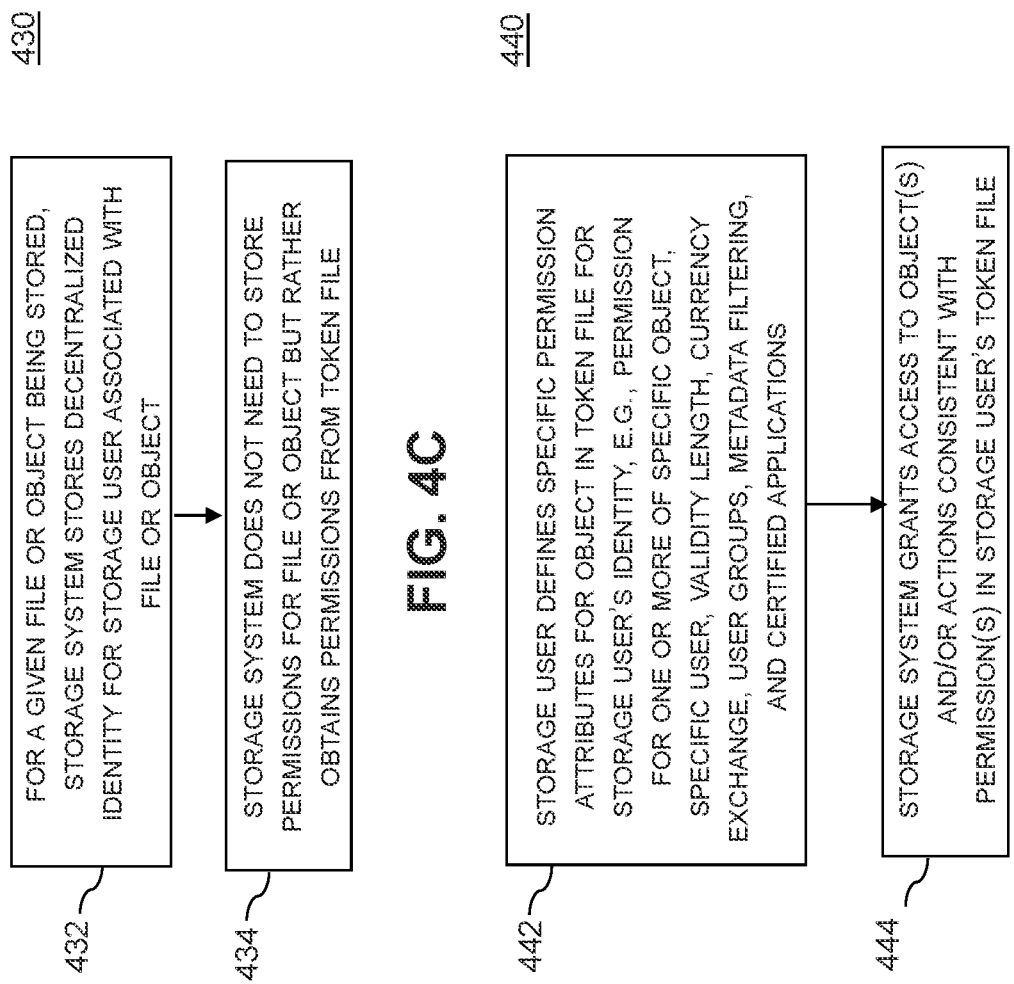

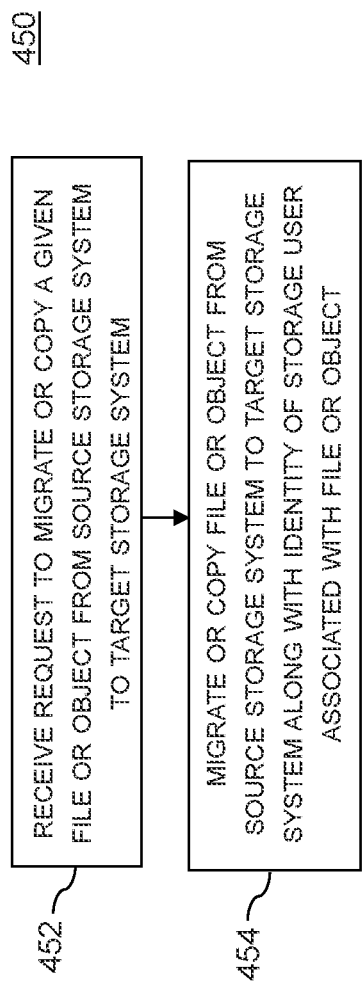

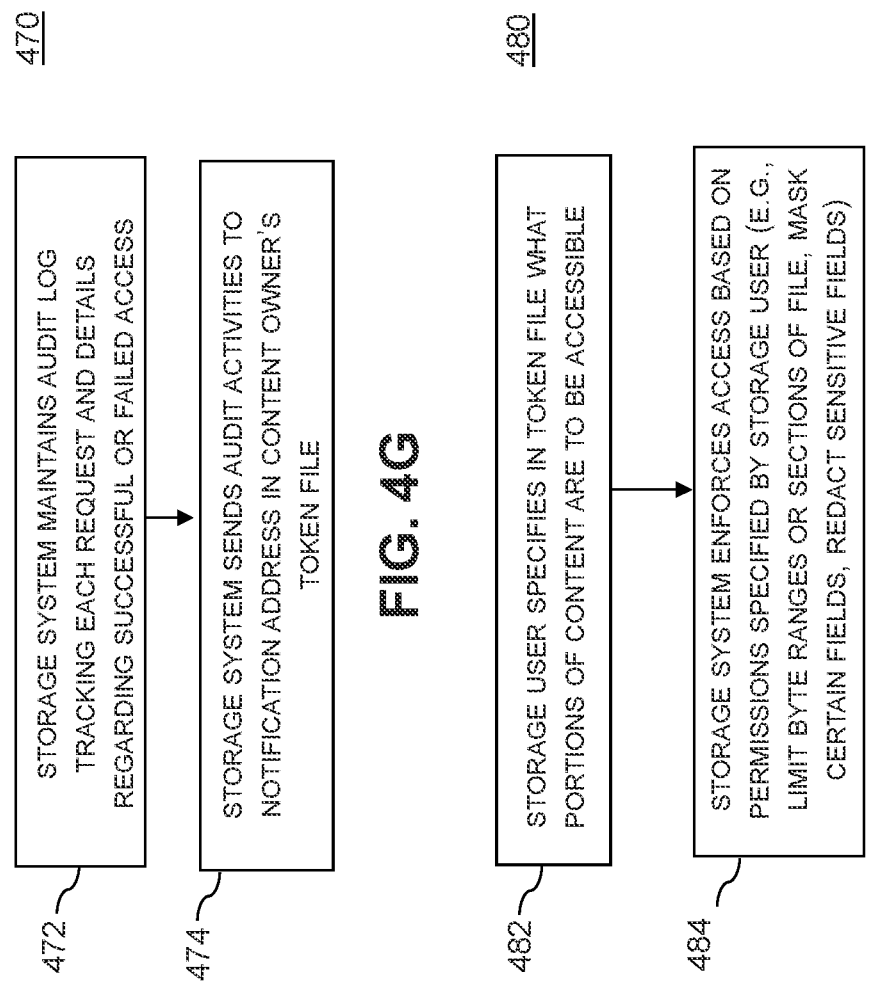

490

492 — ESTABLISH AT LEAST ONE IDENTITY FOR A GIVEN ENTITY IN ACCORDANCE WITH A DECENTRALIZED IDENTITY MANAGEMENT SYSTEM MAINTAINED IN ACCORDANCE WITH A DISTRIBUTED LEDGER, WHEREIN THE IDENTITY OF THE GIVEN ENTITY AND A SET OF ATTRIBUTES RELATING TO THE IDENTITY ARE DEFINED BY A SECURE TOKEN FILE

494 — REFERENCE THE SECURE TOKEN FILE IN THE DISTRIBUTED LEDGER ENABLING TWO OR MORE COMPUTING RESOURCE SYSTEMS TO AT LEAST ONE OF AUTHENTICATE AND AUTHORIZE THE GIVEN ENTITY IN ACCORDANCE WITH THE SECURE TOKEN FILE

496 — RECEIVE, AT A GIVEN STORAGE SYSTEM, A WRITE REQUEST FROM A GIVEN ENTITY TO STORE A DATA SET ON THE GIVEN STORAGE SYSTEM

498 — IN RESPONSE TO THE WRITE REQUEST, ESTABLISH A SET OF TERMS BETWEEN THE GIVEN ENTITY AND THE GIVEN STORAGE SYSTEM IN ACCORDANCE WITH AT LEAST ONE SMART CONTRACT

FIG. 4J

DECENTRALIZED IDENTITIES FOR ACCESS TO MULTIPLE COMPUTING RESOURCE SYSTEMS

CROSS REFERENCE TO RELATED APPLICATION

The present application is a divisional of, and therefore claims priority to, U.S. patent application Ser. No. 15/660,385, entitled "Decentralized Identities for Access to Multiple Computing Resource Systems," now U.S. Pat. No. 11,025,626, filed Jul. 26, 2017, the disclosure of which is incorporated by reference herein in its entirety.

FIELD

The field relates generally to computing resource systems, and more particularly to techniques for accessing multiple computing resource systems such as, for example, multi-cloud storage systems or other multiple storage systems.

BACKGROUND

Consumer storage users often sign up for accounts with storage system providers, e.g., public clouds. Employees working at an enterprise with a private storage system, e.g., private cloud, often have these identities created for them. In either case, the users do not fully own or control these identities. Thus, the same person (i.e., storage user) may need multiple different accounts to store/access data across multiple providers and storage systems.

Furthermore, most storage systems enforce file or object permissions by either keeping their own metadata about users or interfacing with a centralized identity management system, e.g., Microsoft Windows-based Active Directory (AD). This situation becomes untenable when one storage user uses multiple clouds to store data.

SUMMARY

Embodiments of the invention provide systems and methods for decentralized identity management for multiple storage system authentication and/or authorization.

For example, in one embodiment, a method comprises the following steps. At least one identity for a given entity is established in accordance with a decentralized identity management system maintained in accordance with a distributed ledger, wherein the identity of the given entity and a set of attributes relating to the identity are defined by a secure token file. The secure token file is referenced in the distributed ledger enabling two or more computing resource systems (e.g., storage systems) to at least one of authenticate and authorize the given entity in accordance with the secure token file.

Advantageously, illustrative embodiments utilize decentralized identity techniques with secure (e.g., cryptographically signed) token files to control authentication and/or authorization across multiple storage systems, e.g., a multi-cloud storage environment.

These and other features and advantages of the invention will become more readily apparent from the accompanying drawings and the following detailed description.

BRIEF DESCRIPTION OF THE DRAWINGS

FIG. 3 illustrates a token file for use in a decentralized identity management system for authentication and/or authorization in a multiple storage system environment, according to an illustrative embodiment.

FIGS. 4A through 4I illustrate use cases of a decentralized identity management system for authentication and/or authorization in a multiple storage system environment, according one or more illustrative embodiments.

FIG. 4J illustrates smart contract functionalities, according to one or more illustrative embodiments.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a cloud infrastructure hosting multiple tenants that share cloud resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, a business or any other entity, group, or organization. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds).

Illustrative embodiments provide techniques for accessing multiple computing resources such as, e.g., multi-cloud storage systems, using a decentralized identity management system. In one non-limiting example, the decentralized identity management system adapts a Blockstack architecture which will be described below in detail. Before describing such illustrative embodiments, some drawbacks associated with the conventional approach of centralized identity management, e.g., Microsoft Windows-based Active Directory (AD), will first be described.

As mentioned above in the background section, storage users often sign up for multiple accounts with multiple public cloud storage providers and, for purposes of authentication, have multiple identities for the multiple providers. In addition, in the case of an employee for the private enterprise, the storage user may have a separate identity for use in authentication for access to the private storage system.

Figure 1:
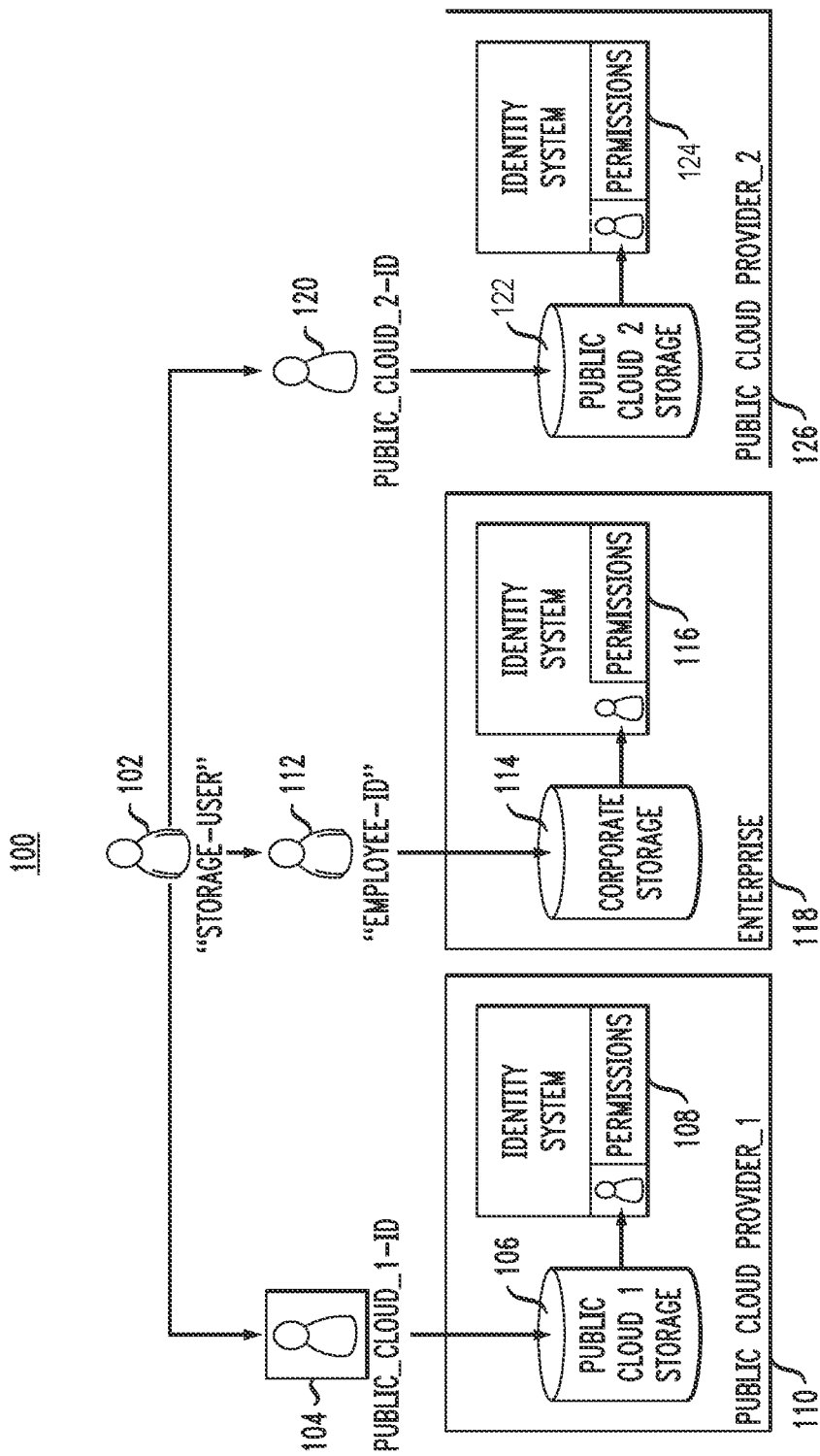
FIG. 1 illustrates conventional authentication in a multiple storage system environment.

FIG. 1 illustrates 100 how the same person (e.g., storage-user) may need multiple (three in this example) different accounts to store/access data across multiple providers, e.g., two public cloud providers and one private provider (e.g., employer of storage-user). As shown, storage-user 102 has: a first identity 104 (Public_Cloud_1-ID) for authentication to access Public Cloud 1 Storage 106 via Identity System/Permissions 108 of Public Cloud Provider_1 110; a second identity 112 (Employee-ID) for authentication to access Corporate Storage 114 via Identity System/Permissions 116 of Enterprise (e.g., employer) 118; and a third identity 120 (Public_Cloud_2-ID) for authentication to access Public_Cloud_2 Storage 122 via Identity System/Permissions 124 of Public Cloud Provider_2 126. It is to be understood that storage-user 102 could have more or less identities for accessing more or less storage systems than what is shown in FIG. 1. The term "multiple" with respect to "storage system," "cloud," "provider," and "computing resource" as used herein refers to a quantity of two or more. Corporate Storage 114 could be a private cloud infrastructure, a private non-cloud infrastructure, or some combination thereof. Examples of public cloud storage (e.g., 106 and 122) and related services include, but are not limited to, Amazon Simple Storage Service (S3), Google Cloud Platform (GCP) Storage, and Microsoft Azure Blob Storage.

It is realized herein that storage-user 102 will have a difficult time trying to manage and access their multi-cloud storage (or other computing resources) accounts. For example, specific problems with this conventional environment are outlined below.

As both individual data and corporate data spread out across multiple cloud providers, the following problems related to granting storage access occur.

The storage-user must maintain multiple logins across providers and log into each account any time that they wish to make a permission change (e.g., grant permission to another user).

Further, any time that the storage-user account wishes to share data with a specific user, or a group of users, this may require that each user and/or group must be created within the context of the cloud in which the data resides.

Any time that the storage-user decides to duplicate data across multiple clouds, for whatever reason, they are often also forced to duplicate (and continually maintain) permissions across all of those copies on all of those clouds.

Should the user or corporate data move from one cloud to another, there is no guarantee that the permissions and accounts that are currently in place will similarly transfer over to the new location. This may require duplication of effort on behalf of the storage-user identity.

Still further, should the data owned by the storage-user undergo an attack and/or access is granted/denied incorrectly, each cloud environment may have separate mechanisms for notifying the same user. Similarly, audit logs of all data existing across multiple clouds cannot be viewed through one lens but instead must be viewed on a cloud-by-cloud basis.

Decentralized identities are fully created, owned, and managed by the users themselves (as opposed to the centralized identities being managed by corporations and/or providers). One such decentralized identity management system is Blockstack (described below), which allows users to create and manage their own profiles on top of decentralized architectures such as blockchain. There are currently no storage architectures that would recognize these new types of identities. These systems do not know how to provide or deny access on read/write/modify operations that originate from decentralized identities.

A decentralized identity profile may describe trusted relationships that the individual (e.g., storage-user) has with other individuals and/or corporations. The profile may also map these trusted relationships onto data sets. Traditional storage systems do not integrate with these trust mappings.

An object may have rich metadata associated with it (e.g., this file contains an "X-ray of my lungs" or a "measurement of my kidney function"). There is currently no way to grant or enforce data access, either within a cloud or across multiple clouds, to specific groups or individuals based on the semantic content of a file.

Different providers charge different amounts for different levels of storage. The storage-user must track, manage, and pay all of these bills separately.

In addition, users that register themselves with providers may not wish to disclose everything about themselves to the provider (e.g., address, phone, etc.).

Certain storage systems may be dedicated to specific classes of users (e.g., only certified radiologists can store data onto this system) writing (or reading) specific classes of data (e.g., only radiology images should be stored here). Implementing this type of filtering is also difficult to do consistently across different cloud architectures.

Illustrative embodiments overcome the above and other drawbacks associated with existing authentication/authorization approaches in a multiple storage system environment. More particularly, illustrative embodiments provide techniques for accessing multiple storage systems (or, more generally, any multiple computing resource systems) using a decentralized identity management system.

In one or more illustrative embodiments, a decentralized identity management system known as Blockstack is adapted for authentication across multiple storage systems. Blockstack is described in detail, for example, in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. However, it is to be appreciated that embodiments are not limited to using Blockstack as a decentralized identity management system, and thus embodiments are more generally applicable to any other suitable, non-Blockstack based, decentralized identity management system.

In general, Blockstack uses a blockchain to bind a digital property, such as a name, to a given value. Immutability and therefore trust are provided in a decentralized manner by allowing for any new node in the system to independently verify data bindings through the blockchain. More particularly, a Blockstack architecture has four layers, two in the control plane and two in the data plane. The control plane includes a blockchain layer and a virtual chain layer. The data plane includes a routing layer and a data storage layer.

The blockchain layer is the bottommost functional layer, and serves to store the Blockstack operations (encoded in transactions on the blockchain distributed ledger) and to provide consensus on the order in which the Blockstack operations were written. Blockstack operations typically include name registrations, updates, and transfers.

The virtual chain layer is functionally implemented above the blockchain layer. The virtual chain layer is configured to define new Blockstack operations without changing any data on the blockchain layer. The logic for accepting or rejecting new Blockstack operations is contained in the virtual chain layer.

Above the control plane (blockchain layer and virtual chain layer), the data plane separates the function of routing requests (routing layer) from the function of storing data (data storage layer). More particularly, Blockstack uses zone files (having the same format as a zone file of a domain name service (DNS)) for routing information. The virtual chain layer binds names to respective hashes of the zone files and stores these bindings in the control plane. However, the zone files themselves are stored in the routing layer. The integrity of a given zone file is verified by verifying the hash of the given zone file in the control plane.

The data storage layer is the topmost functional layer in the Blockstack architecture. The actual data values of the name-value pairs are stored in the data storage layer, and are signed by the cryptographic key of the owner of the name. The integrity of a given data value can be verified in the control plane.

Accordingly, the Blockstack architecture uses these four functional layers to implement a naming system. Names are owned by cryptographic addresses of the underlying blockchain layer and their associated private keys. A user claims a name by being the first to perform a successful preorder and register operation for the name. Once a name is registered, a user can update the name-value pair. This is done by initiating an update operation and uploading the new value to the routing layer so as to change the name-value binding. The address that is allowed to sign subsequent transactions can be changed by a name transfer operation. Further details about the Blockstack architecture can be found, for example, in the above-referenced M. Ali et al. paper.

It is to be further understood that, in an illustrative Blockstack architecture, while the blockchain layer is maintained across a first set of distributed compute nodes, the other layers of the Blockstack architecture are maintained across a second set of distributed compute nodes which are in communication with one or more of the blockchain compute nodes.

As used herein, the terms "blockchain," "digital ledger" and "blockchain digital ledger" may be used interchangeably. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data. In the Blockstack context, examples of transactions can be operations of preordering a new name-value pair, registering a new name-value pair, and changing an existing name-value pair.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol in a Blockstack naming system and that embodiments of the invention are not limited to the above or any particular blockchain protocol or naming system implementation. As such, other appropriate processes may be used to securely maintain and add to a set of data in accordance with embodiments of the invention. For example, distributed ledgers such as, but not limited to, R3 Corda, Ethereum, and Hyperledger may be employed in alternative embodiments.

Accordingly, in a Blockstack naming system, one or more compute nodes allow for identities to be created by registering a name and then associating identity information with that name (e.g., as described above, a reference pointer in the blockchain points to a given zone file, and the given zone file ultimately points to information about the user's identity).

For example, assume that an identity for an employee of a company is created by the company using an identification badge number of the employee. The company keeps the private key for that identity and the Blockstack naming system accepts the identity in a two-phase commit ("preorder" command followed by "register" command) where the public key can verify the private key being used by the company. In a similar way, an individual or other entity can create an identity himself (using the two-phase commit) that has its own private key, thus creating a decentralized identity that is fully owned and managed by him. The identity is "remembered" across every node in the bitcoin ledger due to Blockstack's use of a private scratchpad location in a bitcoin transaction. The replication of each bitcoin transaction into a decentralized blockchain results in a public decentralized identity registry.

As used illustratively herein, the term "authentication" refers to a process of validating that an individual or entity is who the individual or entity purports to be. The term "authorization," as illustratively used herein, refers to a process of giving a person access to certain protected items, locations, and the like. However, it is to be appreciated that terms such as authenticate, authorize, validate, and the like, may be used interchangeably without limiting the scope of the embodiments.

Figure 2:
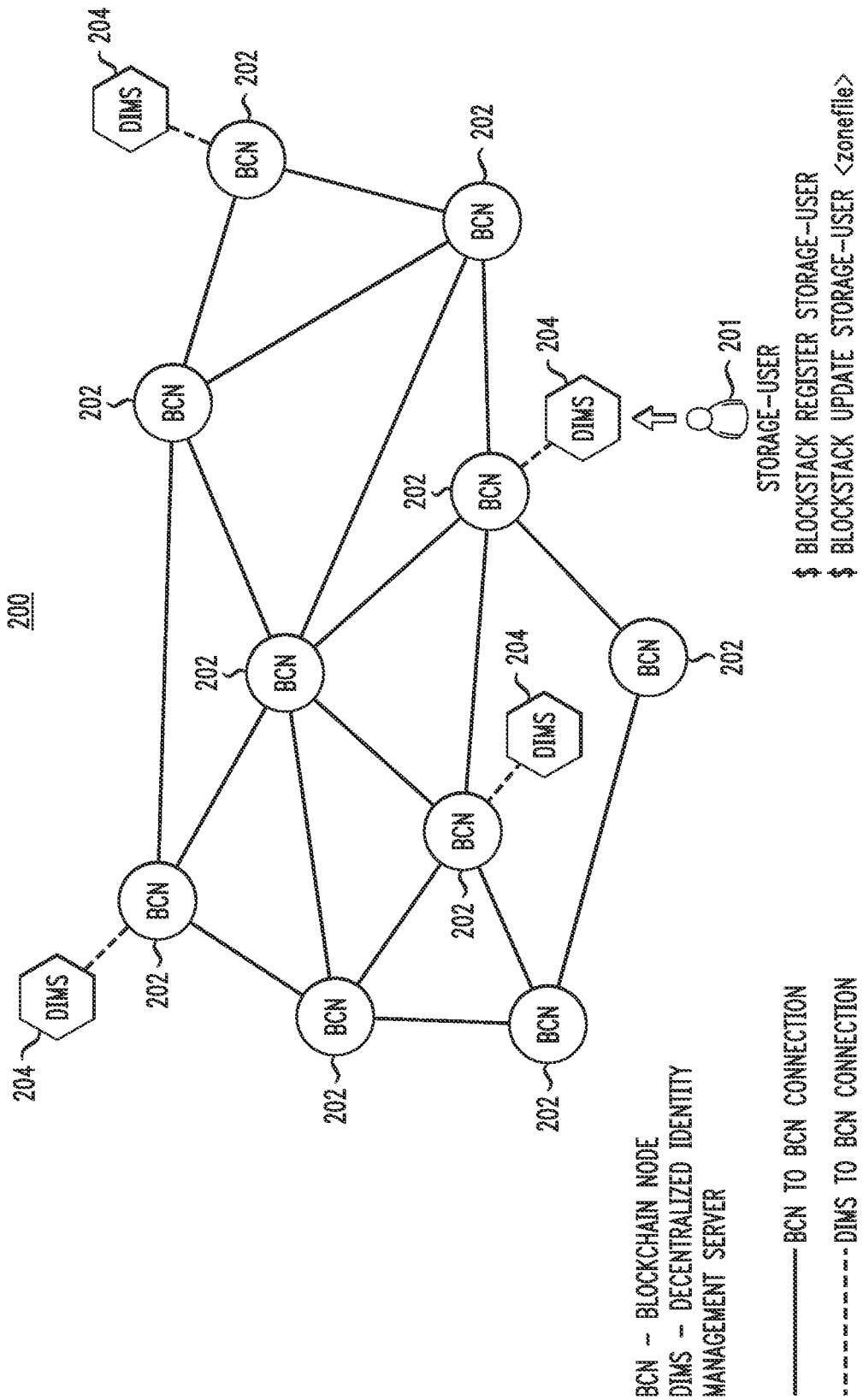
FIG. 2 illustrates a decentralized identity management system for authentication and/or authorization in a multiple storage system environment, according to an illustrative embodiment.

FIG. 2 illustrates a decentralized identity management system 200 with multiple storage system authentication functionality according to an illustrative embodiment. While one storage-user 201 is shown performing register and update operations with respect to system 200, it is to be understood that multiple storage-users may communicate and interact with system 200 creating their own decentralized identities.

As further shown, system 200 comprises a first set of compute nodes referred to as blockchain nodes (BCN) 202. Each BCN 202 is operatively coupled to one or more other BCNs 202 via a communication connection (as part of a communications network). The system 200 also comprises a second set of compute nodes referred to as decentralized identity management servers (DIMS) 204. In one embodiment, the DIMS are Blockstack nodes. Each DIMS 204 is operatively coupled to at least one BCN 202 via a communication connection (as part of a communications network). Each DIMS may also be connected to one or more other DIMS. The BCNs 202 form a blockchain ledger while the DIMSs 204 form the naming system in conjunction with the underlying blockchain distributed ledger. In a Blockstack implementation, the DIMSs 204 form what is referred to as the virtual chain layer which logically resides on top of a bitcoin network formed by BCNs 202. The routing layer and data storage layer can be part of the DIMS 204, or they can be implemented on different nodes.

Given the configuration of system 200, assume that a person or entity wishes to register an identity with system 200 as "storage-user" that will be used to access multiple storage systems, e.g., multiple clouds (e.g., private clouds, public clouds and/or hybrid clouds). As shown, the person registers the identity with the decentralized identity management system 200. The person can update the identity as well using the update operation.

The identity and one or more attributes associated with the identity are defined in a profile record (e.g., a token file or token) cryptographically signed by the person. In the context of a Blockstack adaptation, a reference pointer to a zone file is stored in the blockchain, and then the zone file contains a reference pointer to the cryptographically signed token file. Thus, advantageously, the blockchain distributed ledger (e.g., at the blockchain layer) references the cryptographically signed token file (e.g., stored at the data storage layer). The referencing, in this illustrative embodiment, is provided by pointers that provide the connection from the blockchain layer, through the virtual chain layer and the routing layer, to the data storage layer.

More particularly, FIG. 2 highlights a user ("storage-user") informing Blockstack to register and create a fully-owned identity. Note that the identity refers to a zone file. Note also that the zone file, as mentioned above, points to the storage-user's profile record (e.g., token file or token). This token file, as will be explained further below, can contain information that storage-user 201 wishes to reveal. It is to be appreciated that, in some embodiments, the storage user may wish to have more than one token file that the user spreads out at different storage locations (e.g., the zone file points to multiple token files).

FIG. 3 illustrates how a decentralized identity can share information about themselves through the use of an ID, a zone file, and through a token file in the form of a JavaScript Object Notation (JSON) Web Tokens (JWTs). For example, process 300 shows the user ("storage-user") associating their name with a hash of a zone file (DNS information related to "storage-user"). This association is timestamped and permanently stored in the blockchain (e.g., Bitcoin) distributed ledger as a transaction (e.g., 302). The zone file (e.g., 304) then highlights the identity of storage-user by storing token records in a profile (e.g., 306). Profile 306 is an example of a token file which, itself, in this non-limiting example, comprises information sections 310, 312, and 314 that define information such as the identity and the one or more attributes associated with the identity. Information section 310 indicates whether or not the token file itself or any part of the token file is encrypted by a cryptographic key. Information section 312 indicates one or more of the public keys used either to decrypt the information in the token file or to validate the signatures. In general, information is encrypted with a private key (either all the information or just a signature) and decryption via the public key then shows that only the holder of the private key could have generated the information. Information section 314 specifies the identity and the set of attributes associated with the identity. For example, illustrative capabilities described below are defined by the inclusion of rules and other attributes in information section 314 of storage-user's profile (e.g., token file) 306. In addition, as will be further explained below, the various storage systems that interact with a decentralized identity management system described herein are configured to operate in conjunction with the rules and other attributes specified in a given token file associated with a given decentralized identity.

The storage-user manages the ecosystem in FIG. 3 via the use of a private key. Entries in the blockchain distributed ledger are signed with this private key. Every entry stored into the profile can be signed with the same private key (e.g., as a JSON Web Token).

Once storage systems (e.g., public cloud, private cloud, hybrid cloud, non-cloud) are configured to integrate with this type of identity system, many advantages are realized. For example, in accordance with illustrative embodiments, identity and data access permission are implemented in a consistent manner across multiple clouds. In addition, many new capabilities are available, which will be described below in detail.

While there are many possible ways that a storage system may integrate with a decentralized identification system, one illustrative example is described below. This example is purely for illustrative purposes and not intended to limit embodiments of the invention from being used in storage systems which integrate with decentralized identification systems in a different manner.

When a request arrives at the storage system (any type of request), the request should contain the (typically human readable) username of the identity making the request (e.g., "storage_user.id"), the request content itself, and a signature field, generated by signing the request with the identity's private key.

As the information about the identity is not stored locally on the storage system, the storage system calls into the decentralized identity management system 200 to retrieve information about the profile, also validating the signature at the same time (via the public key of the identity). With this information, the storage system determines if the request is authorized or not, which may be based on any number of factors such as, but not limited to:

(i) The storage system may have a local record asserting that identity "storage_user.id" has read/write access.

(ii) The "storage_user.id" may have a signed token, from the storage system or from the owner of the storage system, asserting that the user has read/write access.

(iii) The storage system may have a local record that members of a certain group have read/write access, and the "storage_user.id" may have a signed token asserting that they are a member of that group. An example would be that the storage system may grant access to any employee of a given company, and if "storage_user.id" has an appropriate signed token from the given company, they are granted access.

Various illustrative capabilities of the above-described functionalities will now be described below in the context of FIGS. 4A through 4I.

(i) No need to create storage-specific identities. Once a storage system (e.g., Elastic Cloud Storage or ECS' from Dell EMC) has learned to discover the profile of a decentralized identity, there is no need to check whether or not that identity already has an account. There is also no need to require any additional information about that identity should they wish to pay electronically.

Figure 4A:
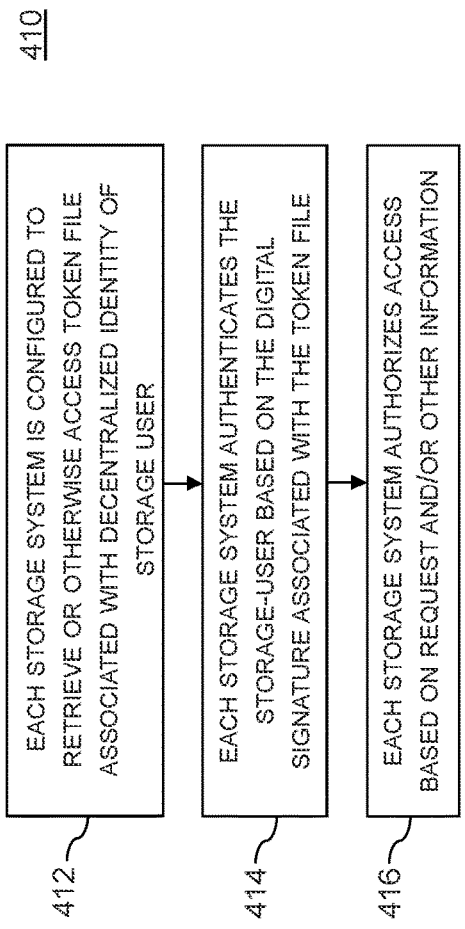

Thus, as illustrated in process 410 of FIG. 4A, each storage system (of the multiple storage systems that a given storage user may wish to access) retrieves or otherwise accesses the token file (e.g., profile) associated with the decentralized identity of the given storage user, in step 412. For example, the storage system can retrieve the token file from the decentralized identity management system 200 in FIG. 2. In step 414, each storage system authenticates the given storage user based on the digital signature associated with the token file (e.g., using the public key of the storage user to verify the private key used to sign the token file). Then, in step 416, each storage system authorizes access based on a given request and/or other information (e.g., as mentioned above, local or other information that the storage system possesses or obtains, and/or permission attributes in the token file).

(ii) No need to bill specific accounts. In response to a new user wishing to store data into a specific cloud, the cloud provider can respond with a contractual agreement (e.g., in the form of a smart contract). In response to this contract, a user can authorize the transfer of funds (e.g., bitcoins) automatically between accounts. This could result in the provider being paid immediately based on the amount of data transferred. Other embodiments include scenarios where payment occurs after the user performs a validating read, or after a time period expires, or on a regular schedule. This could be stated in the smart contract.

Figure 4B:
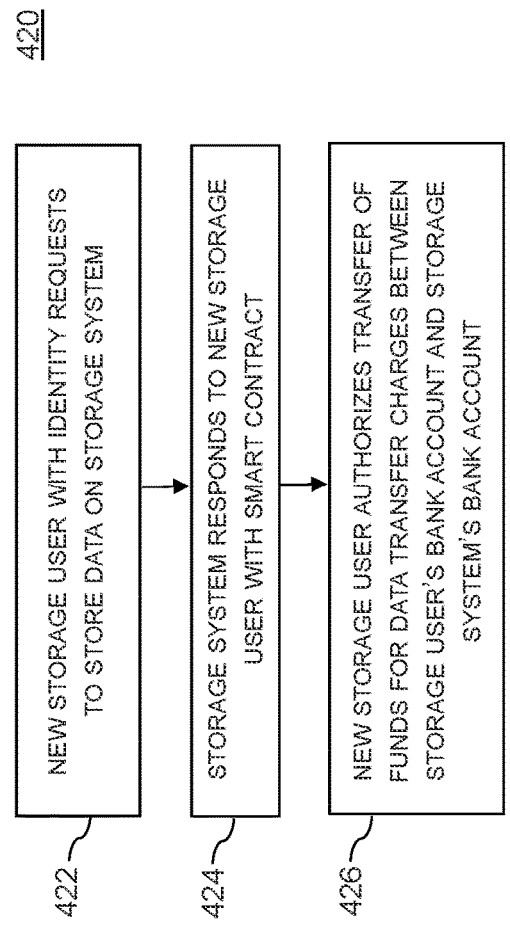

Thus, as illustrated in process 420 of FIG. 4B, a new storage user with a decentralized identity requests to store data on a storage system, in step 422. In step 424, the storage system responds by sending the new storage user a smart contract. Then, in step 426, the new storage user authorizes transfer of funds for data transfer charges between the storage user's bank account and the storage system's bank account. Alternatively, as described above, before step 426, there could be additional steps or a built-in delay before step 426 occurs.

(iii) Acceptance of signed storage access requests. When a storage system receives a request to read or write data from a decentralized identity, a digital signature can validate that this request indeed comes from the user known as "storage-user." The digital signature proves that they own the private key. For example, see step 414 above in FIG. 4A.

(iv) No need to store read or execute permissions. A storage system would only need to store the identity ("storage-user") of the original file or object (e.g., "X-RAY").

There would no longer be a need for the storage system to track permissions for that file or object within the storage system or within the context of an external identity management server (e.g., Active Directory) since these permissions are now made part of the attributes of the token file associated with the decentralized identity of the storage user.

Thus, as illustrated in process 430 of FIG. 4C, for a given file or object being stored, a storage system stores the decentralized identity for the storage user associated with the file or object, in step 432. As a result, as indicated in 434, the storage system does not need to store permissions for the file or object since these permissions are set in the token file.

(v) Read permissions: specific objects, specific user. When storage-user wishes to grant access for a specific file and specific user, they update their own profile. For example, if storage-user wishes to grant a specific doctor ("e.g., DR-SMITH") permission to access a specific X-ray ("My-Storage-User-XRAY"), they can create a JWT token record into their profile authorizing that association, and digitally signing that authorization with their private key.

When the storage system receives a read request for object "My-Storage-User-XRAY", they notice that the read request is coming from "DR-SMITH".

Upon noticing that "storage-user" has a profile authorizing this transaction, and after confirming that DR-SMITH has digitally signed the read request with the correct private key, the operation is permitted to proceed.

Thus, as illustrated in process 440 of FIG. 4D, a storage user defines specific permission attributes for an object in the token file for storage user's identity, in step 442. As described above and as will be described below in sections (vi) through (ix), permission attributes may include for one or more of permission for a specific object, a specific user, a validity length, a currency exchange, user groups, and metadata filtering. In addition, a permission can be specified that allows access to content by previously "certified" applications (e.g., applications for which it is known that the application will not make a copy of the data). These applications may be "named" (e.g., iTunes), or they could have identities themselves. In step 444, the storage system grants access to objects and/or performance of actions consistent with the permissions in the token file of the storage user.

(vi) Read permissions: validity length. When storage-user grants access for a specific file and a specific user, they can also specify an expiration or limit to the reads being performed against a particular file. This limit may be in the form of a date, a number of reads, or any combination thereof. This validity may also authorize the storage system to cache the association for a given length of time in order to prevent redundant lookups.

(vii) Read permissions: currency exchange. Data created by one party and read by another can result in a currency exchange in either direction. The successful read of data by a third party can trigger a smart contract execution to perform this exchange. This contract can be specified in storage-user's profile and digitally agreed to by both parties.

The storage system can trigger this transaction after completing the last byte of the read request.

In the case of storage-user and DR-SMITH, the storage-user may be paying the doctor for diagnostic services, or the doctor may be paying the patient for the privilege of exploring a rare bone condition.

This can all be agreed ahead of time and triggered automatically upon read.

(viii) Read permissions: user groups. Should storage-user wish to grant permission to a specific group of people (e.g., graduates of a certain college, employees of a certain hospital), then the user can specify that a data asset be accessed by any identity that can prove membership. This membership of course is predicated on the fact that the user has an up-to-date (non-expired), signed certification from a certain organization (university, hospital, etc.) stating that they are a member.

The storage system, upon receiving a request for a given piece of content ("My-Storage-User-XRAY") by a given identity ("Doctor 1, medical specialist at Hospital X), can validate that the reader is in possession of a private key that conclusively identifies he or she as a member.

(ix) Read permissions: metadata filtering. Should a storage-user generate hundreds of medical records and store them onto a storage device, each one of them may have identifying metadata associated with the actual content. This metadata may include date and time, procedure (X-RAY, bloodwork), location (address), organization (which hospital), etc.

A storage-user can update their profile to grant access to any piece of content where "procedure=X-RAY. This access can be given to an individual or a group.

This would allow a doctor, for example, to query the number of X-RAYS that storage-user has undergone for the past 10 years, and then fetch each one individually. This doctor, however, would not have access to bloodwork.

Similarly, storage-user may grant access to all medical records captured at a specific hospital (e.g. organization="Hospital X").

(x) Migrating/copying data. When data is moved or copied to another storage system, the only authentication data that travels with it is the identity of the content creator.

As long as the target storage system understands how to interact with a decentralized identity implementation such as one described herein in accordance with illustrative embodiments, the authentication and authorization behavior will remain identical because the changed/duplicate location does not rely on any other metadata other than the (unchanged) identity profile in the given token file of storage-user.

Thus, as illustrated in process 450 of FIG. 4E, a request to migrate or copy a given file or object from a source storage system to a target storage system is received in step 452. In step 454, the file or object is migrated/copied along with the identity of the storage user associated with the file or object.

(xi) Storage system usage based on identity/content. Should a cloud-based data repository be created that is dedicated for a specific use (e.g., only certified radiologists can store radiology images to this system), the system can be programmed to inspect the profiles (token files) of storage users making incoming write requests and verify, for example, that: (a) the writer is a certified radiologist; or (b) that radiologist is writing an image that has the appropriate "procedure=X=RAY" tag.

Thus, as illustrated in process 460 of FIG. 4F, a storage system receives an incoming write request from a storage user, in step 462. In step 464, the storage system verifies the write request based on the token file of the requesting storage user.

(xii) Audit trails and notification. There are currently no systems that implement audit logs based on the (successful or unsuccessful) authentication and authorization that occurs as a result of the above capabilities (i) through (xi) and (xiii) below. Thus, in accordance with illustrative embodiments, a storage system can be configured to implement an audit log that tracks each request and either cites the rule that permitted access or the identities of those who failed access (and what they were trying to access). All or some of this auditing activity can be sent (immediately or batch) to a notification port specified in the identify profile (e.g., token file) of the content owner.

Thus, as illustrated in process 470 of FIG. 4G, in step 472, the storage system maintains an audit log tracking each request and details regarding successful or failed access. Then, in step 474, the storage system sends audit activities to notification address in content owner's token file. The storage system may encrypt the audit activity information before sending it.

(xiii) Transforming/Limiting Data Upon Access. As a decentralized identity controls who may see certain data (e.g., user, group, anyone), they may also instruct the storage system to limit "what portion" of the data they may access. This may include any number of techniques, including, but not limited to: specifying byte ranges or sections of a file; masking certain fields (e.g., social security number); and redacting fields that have been tagged as sensitive. This would allow a content owner, for example, to share details about their car manufacturer but not their driving telemetry, etc.

Thus, as illustrated in process 480 of FIG. 4H, the storage user specifies permissions in his/her token file defining what portions of content are to be accessible, in step 482. Then, in step 484, the storage system enforces access based on the permissions specified by the storage user (e.g., limit byte ranges or sections of file, mask certain fields, redact sensitive fields).

FIG. 4I illustrates a methodology 490 for utilizing decentralized identity management for authentication and/or authorization in a multiple computing resource system environment (e.g., multi-cloud storage environment), according to an illustrative embodiment.

In step 492, at least one identity for a given entity is established in accordance with a decentralized identity management system maintained in accordance with a distributed ledger, wherein the identity of the given entity and a set of attributes relating to the identity are defined by a secure (e.g., cryptographically signed) token file, e.g., token file 306.

In step 494, the secure token file is referenced in the distributed ledger enabling two or more computing resource systems to at least one authenticate and authorize the given entity in accordance with the secure token file. While illustrative embodiments have been described with the computing resource being storage, it is to be understood that alternative embodiments may be implemented for other computing resources.

Referring back to the description above with respect to FIG. 4B and permissions for currency exchange, recall that: (i) the storage system returns a smart contract on a write request that stipulates how much the write will cost, and the money is (eventually) exchanged after or during the write; and (ii) the user specifies a smart contract in the identity token file that triggers a currency exchange (in either direction) between identities on reads.

FIG. 4J illustrates an overall process 495 for establishing smart contracts between storage users and storage systems (e.g., between storage user and a provider of a data storage system).

In step 496, a write request is received at a given storage system from a given entity (e.g. storage user) to store a data set on the given storage system, wherein the given entity has an identity profile associated therewith. The identity profile may be associated with a decentralized identity as described herein or a centralized identity.

In response to the write request, in step 498, a set of terms is established between the given entity and the given storage system in accordance with at least one smart contract Given process 495, the following functionalities relating to such smart contracts can be implemented:

(i) On write requests, a smart contract is returned to the user as a reference (pointer) to a smart contract, or the smart contract itself may be embedded.

(ii) On write requests, the storage system may wish to pay the identity for storing a certain type of file (e.g., I will pay you if you store your X-RAY to me). This is specified in a smart contract. Alternatively or additionally, the smart contract can specify what the storage user pays the storage system.

(iii) On write requests, the identity keeps the smart contract and the storage system agrees to the terms as well.

(iv) Payment in accordance with the smart contract can happen during the write, upon the first read, after some time has expired, as part of an overall billing cycle, etc.

(v) On write requests, the user specifies a variety of cryptocurrency transfer options when other parties read the content. This can include prices that decline over time (e.g., more expensive during the first month, increasingly less expensive over the next few months, and eventually free in one year). Read requests would execute these payments.

(vi) On write requests, the user could specify different cryptocurrency transfer options based on who the person is. For example, students at universities could read the content for free or a reduced fee, while corporate identities pay full price. Read requests would execute these payments.

(vii) On write requests, the user specifies different cryptocurrency transfer options based on providing full access to the file. Full price returns the entire file, lesser prices anonymize or mask certain fields, and lesser prices also may return only portions of the file. Read requests would execute these payments.

(viii) Similarly, the user specifies different cryptocurrency transfer options on the resolution of the file (e.g., lower resolution is lower cost).

(ix) Storage providers that execute read requests may expect to get paid a percentage of the the transaction. This can be accomplished by specifying two different smart contracts (e.g., one to transfer money to the identity, the other to transfer money to the storage system). Alternatively, one smart contract can result in two separate transactions. Still further, the storage system or identity may receive full payment and then forward a percentage to the other.

(x) In a further embodiments, before a potential requesting user of the storage system reads content that has currency transfer options or stipulations, the user may want to be able to look at the options or stipulations. In one example, the potential requesting user issues a pre-read request or query that asks the storage system if there are any smart contracts associated with the content on a read request. Additionally, or optionally, a read request to a storage system may return a smart contract as part of the protocol, and the potential requesting user may proceed with the read by responding with a message effectively indicating "yes I agree, please send."

At least portions of the system for decentralized identity management for authentication and/or authorization in a multiple storage system environment shown in FIGS. 1-4J may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 5.

As is apparent from the above, one or more of the processing modules or other components of the system for decentralized identity management for authentication and/or authorization for multiple storage systems shown in FIGS. 1-4J may each run on a computer, server, storage device or other processing platform element. A given such element may be viewed as an example of what is more generally referred to herein as a "processing device." An example of such a processing platform is processing platform 500 shown in FIG. 5.

The processing platform 500 in this embodiment comprises a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM) or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 5:
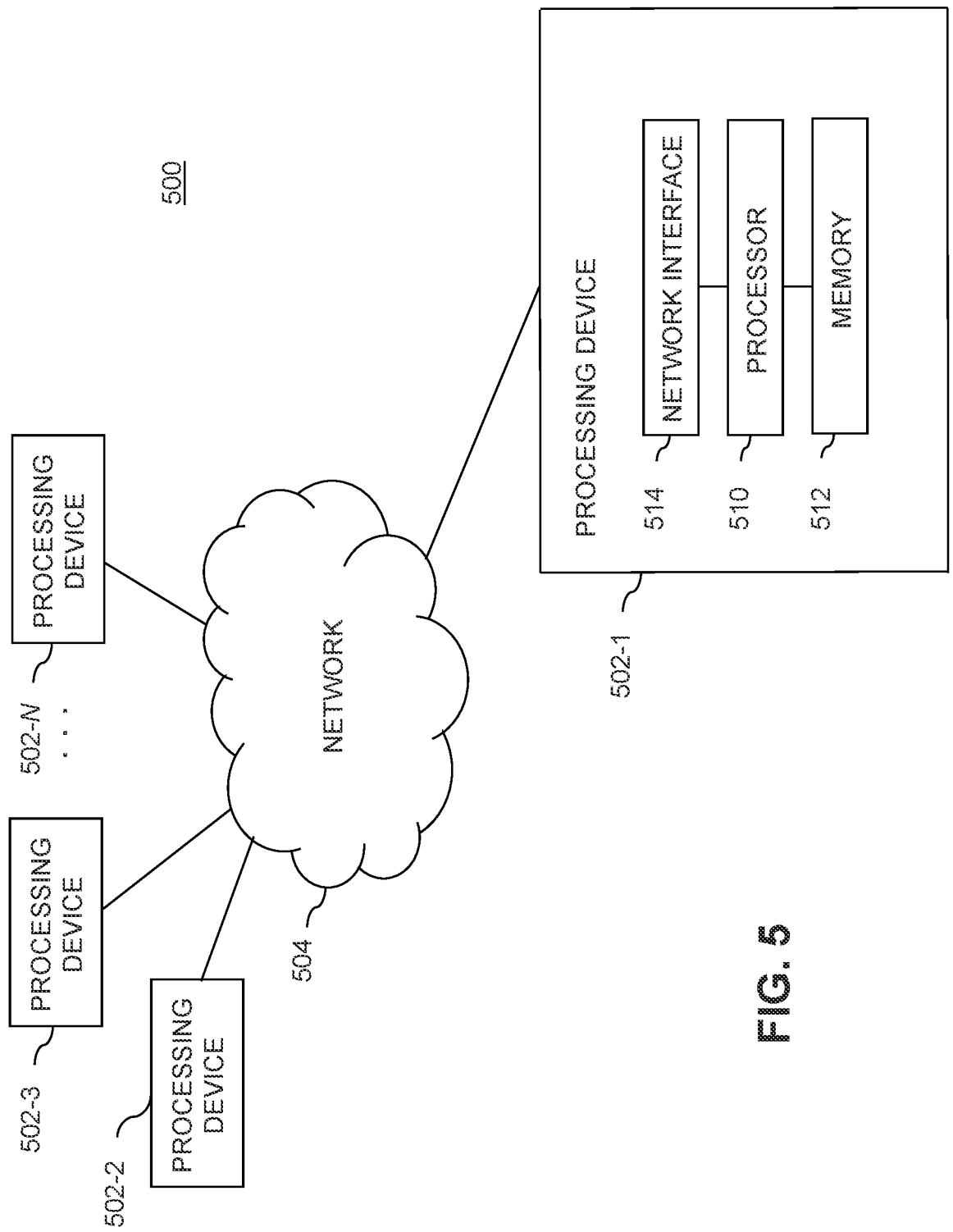
FIG. 5 illustrates a processing platform used to implement a decentralized identity management system for authentication and/or authorization in a multiple storage system environment, according to an illustrative embodiment.

Also included in the processing device 502-1 of the example embodiment of FIG. 5 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of the system for decentralized identity management for authentication and/or authorization for multiple storage systems, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock ° converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the system for decentralized identity management for authentication and/or authorization for multiple storage systems. Such components can communicate with other elements of the system over any type of network or other communication media.

As indicated previously, in some embodiments, components of the system for decentralized identity management for multi-cloud storage authentication and/or authorization as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems for decentralized identity management for multi-cloud storage authentication and/or authorization. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method, comprising:
associating a secure token file with at least one identity for a given entity, wherein the at least one identity of the given entity and a set of attributes relating to the identity are defined by the secure token file to create an identity profile for the given entity, wherein the set of attributes defined by the secure token file comprises at least one permission attribute;
receiving, at a given storage system, a write request from the given entity to store a data set on the given storage system;
determining if the write request is authorized based on authentication of the permission attribute of the secure token file;
in response to the write request being authorized, sending, from the given storage system to the given entity, at least one smart contract to define one or more terms of an access relationship comprising access to store the data set on the given storage system;
receiving, at the given storage system from the given entity, acceptance of the at least one smart contract; and
granting access to the given entity to store a data set on the given storage system;
wherein the method is implemented via one or more processing devices each comprising a processor coupled to a memory.

2. The method of claim 1, wherein, upon receipt of the write request, the given storage system returns the at least one smart contract to the given entity as a reference to a smart contract or the at least one smart contract itself.

3. The method of claim 1, wherein the at least one smart contract specifies one or more payment terms between the given storage system and the given entity for storing a certain type of file.

4. The method of claim 1, wherein the given entity maintains the at least one smart contract and the given storage system agrees to the one or more terms of the at least one smart contract.

5. The method of claim 1, wherein the at least one smart contract specifies when payment occurs with respect to read requests of the data set at the given storage system.

6. The method of claim 1, wherein the at least one smart contract specifies a set of cryptocurrency transfer options when other entities read the data set stored on the given storage system, and wherein a given read request by one of the other entities causes execution of a payment.

7. The method of claim 1, wherein the at least one smart contract specifies a set of cryptocurrency transfer options dependent on the identity of a read requesting entity, and wherein a given read request by the read requesting entity causes execution of a payment.

8. The method of claim 1, wherein the at least one smart contract specifies a set of cryptocurrency transfer options dependent on one or more of an amount of content access given to the data set and an amount of resolution access given to the data set, and wherein a given read request causes execution of a payment.

9. The method of claim 1, wherein the at least one smart contract specifies that the given storage system and the given entity share a payment associated with a read request for the data set.

10. The method of claim 1, further comprising receiving a query from a subsequent user of the given storage system requesting the set of terms of the at least one smart contract prior to the given storage system responding to a read request from the subsequent user for the data set.

11. An apparatus, comprising:
at least one processor operatively coupled to at least one memory and configured to:
associate a secure token file with at least one identity for a given entity, wherein the at least one identity of the given entity and a set of attributes relating to the identity are defined by the secure token file to create an identity profile for the given entity, wherein the set of attributes defined by the secure token file comprises at least one permission attribute;
receive, at a given storage system, a write request from the given entity to store a data set on the given storage system;
determine if the write request is authorized based on authentication of the permission attribute of the secure token file;
in response to the write request being authorized, send, from the given storage system to the given entity, at least one smart contract to define one or more terms of an access relationship comprising access to store the data set on the given storage system;
receive, at the given storage system from the given entity, acceptance of the at least one smart contract; and
grant access to the given entity to store a data set on the given storage system.

12. The apparatus of claim 11, wherein, upon receipt of the write request, the given storage system returns the at least one smart contract to the given entity as a reference to a smart contract or the at least one smart contract itself.

13. The apparatus of claim 11, wherein the at least one smart contract specifies one or more payment terms between the given storage system and the given entity for storing a certain type of file.

14. The apparatus of claim 11, wherein the given entity maintains the at least one smart contract and the given storage system agrees to the one or more terms of the at least one smart contract.

15. The apparatus of claim 11, wherein the at least one smart contract specifies when payment occurs with respect to read requests of the data set at the given storage system.

16. The apparatus of claim 11, wherein the at least one smart contract specifies a set of cryptocurrency transfer options when other entities read the data set stored on the given storage system, and wherein a given read request by one of the other entities causes execution of a payment.

17. The apparatus of claim 11, wherein the at least one smart contract specifies a set of cryptocurrency transfer options dependent on the identity of a read requesting entity, and wherein a given read request by the read requesting entity causes execution of a payment.

18. A computer program product comprising a non-transitory processor-readable storage medium having stored therein program code of one or more software programs, wherein the program code when executed by at least one processing device causes the at least one processing device to:
associate a secure token file with at least one identity for a given entity, wherein the at least one identity of the given entity and a set of attributes relating to the identity are defined by the secure token file to create an identity profile for the given entity, wherein the set of attributes defined by the secure token file comprises at least one permission attribute;
receive, at a given storage system, a write request from the given entity to store a data set on the given storage system;
determine if the write request is authorized based on authentication of the permission attribute of the secure token file;
in response to the write request being authorized, send, from the given storage system to the given entity, at least one smart contract to define one or more terms of an access relationship comprising access to store the data set on the given storage system;
receive, at the given storage system from the given entity, acceptance of the at least one smart contract; and
grant access to the given entity to store a data set on the given storage system.

19. The computer program product of claim 18, wherein, upon receipt of the write request, the given storage system returns the at least one smart contract to the given entity as a reference to a smart contract or the at least one smart contract itself.

20. The computer program product of claim 18, wherein the at least one smart contract specifies one or more payment terms between the given storage system and the given entity for storing a certain type of file.

* * * * *